June 2, 1953     T. W. HOSKING     2,640,722
TRIM FASTENING DEVICE
Filed Aug. 5, 1950
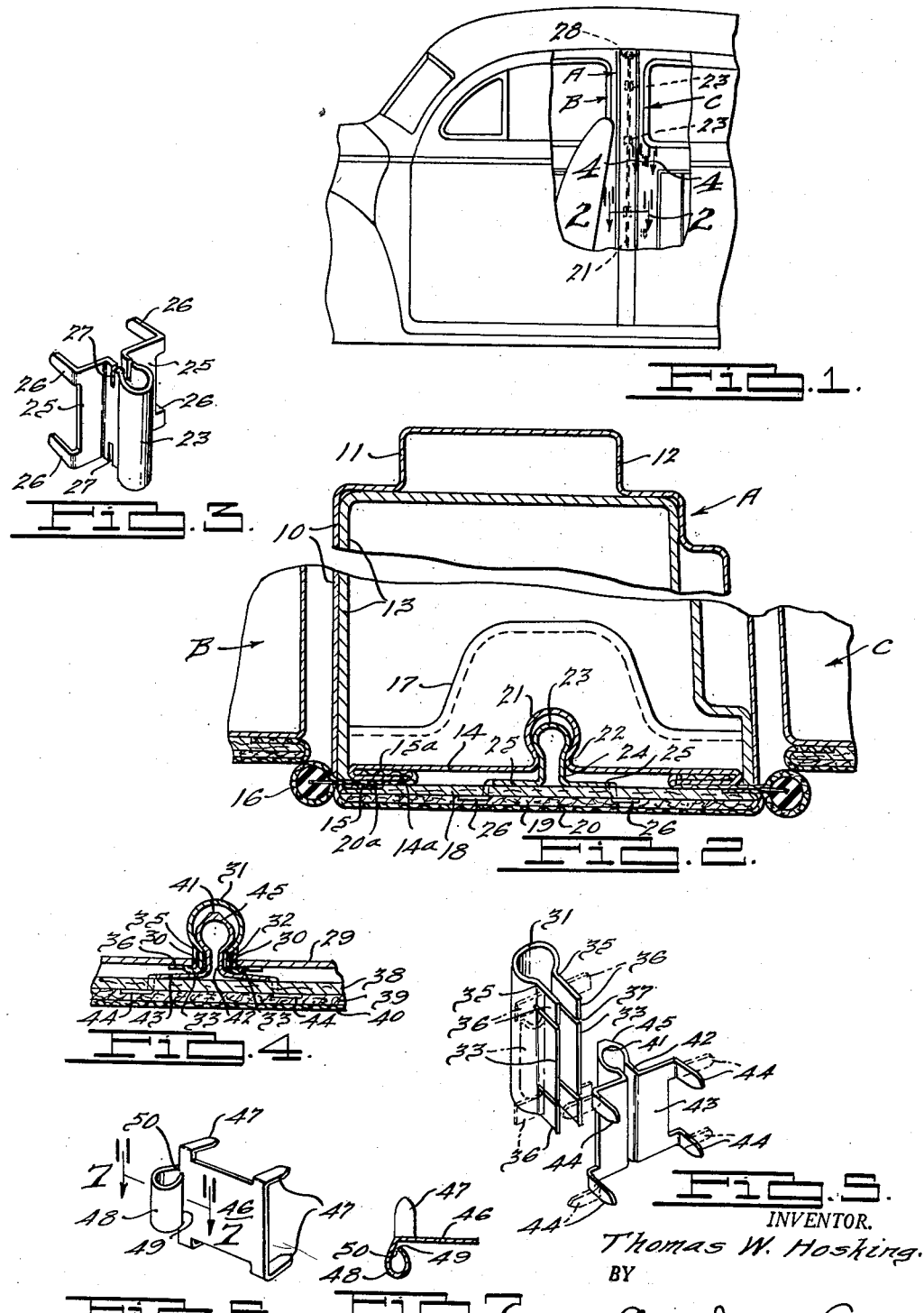

Patented June 2, 1953

2,640,722

UNITED STATES PATENT OFFICE 2,640,722

TRIM FASTENING DEVICE

Thomas W. Hosking, Detroit, Mich., assignor to Briggs Manufacturing Co., Detroit, Mich., a corporation of Michigan Application August 5, 1950, Serial No. 177,870

6 Claims. (Cl. 296—28)

This invention relates to improvements in a vehicle body construction and in particular to an improved interior trim panel and means for securing the same in position within the vehicle body.

An object of the invention is to provide an improved fastener structure for the juxtaposed interior trim panel and metal body panel of an automobile, including cooperating retainer and stud elements adapted to be secured together by snap-action, said elements being relatively simple in construction and adapted to be fabricated at low cost.

Another object is to provide such a fastener structure comprising a pair of resilient channel-like male and female elements carried by the interior trim panel and body panel respectively, the elements each having a constricted channel mouth opening in the same direction and being engageable in an interlocking tongue and groove action, and being separable from each other upon the exertion of sufficient force to spring their resilient sidewalls.

In one embodiment of the present invention, the female or retainer element comprises a channel-like socket portion having a partially closed or constricted mouth. The opposed channel sidewalls at the constricted mouth pass freely through a slot-like aperture in the body panel of less width than the socket portion and terminate in flanges bent oppositely from each other against the panel, whereby the latter is loosely confined between the socket portion and flanges so as to permit expansion of the channel mouth upon insertion of the male channel-like element therethrough.

Another and more specific object is to provide an improved vehicle pillar construction and mounting for an interior trim panel comprising a vertical inward opening pillar channel having a vertical closure plate across the channel mouth and secured to the opposed inner edges thereof. In this structure, the female element is integral with the closure plate and comprises a channel-like socket portion or receptacle extending longitudinally within the pillar channel. The channel mouth of the female element opens inward, i. e. in the same direction that the mouth of the pillar channel opens, and is partially closed or constricted and resiliently yieldable to receive in the manner described above an interfitting longitudinally extending male channel-like element carried by the interior trim panel for the pillar.

By this construction, a rugged reinforced pillar structure is readily provided and the trim panel is quickly and detachably secured thereto merely by snapping the interfitting male and female elements into resiliently maintained interlocking engagement with each other.

Other objects of this invention will appear in the following description and appended claims, reference being had to the accompanying drawings forming a part of this specification wherein like reference characters designate corresponding parts in the several views.

Fig. 1 is a fragmentary side elevation with portions broken away, showing an automobile body constructed in accordance with the present invention.

Fig. 2 is a fragmentary enlarged horizontal section taken through the central pillar of the body in the direction of the arrows substantially along the line 2—2 of Fig. 1.

Fig. 3 is a perspective view showing the male fastening element of Fig. 2 before being attached to the interior trim panel.

Fig. 4 is a fragmentary enlarged horizontal section through a portion of the door panel, taken in the direction of the arrows substantially along the line 4—4 of Fig. 1 and showing a modification of the fastener embodying the present invention.

Fig. 5 is an exploded perspective view showing the male and female fastening elements of Fig. 4 prior to their attachment with the interior trim panel and door panel respectively.

Fig. 6 is a perspective view showing another modification of a male fastening element embodying the present invention.

Fig. 7 is a section taken in the direction of the arrows substantially along the line 7—7 of Fig. 6.

It is to be understood that the present invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring particularly to Figs. 1 and 2, an automobile body is shown having a central pillar A against which the doors B and C close. The pillar A comprises an outer channel 10 opening inward and formed with the usual vertically extending rabbeted portions 11 and 12 against which the doors B and C close. The pillar A also comprises an inner supporting channel 13 which opens inward and is closed at the inner face of the pillar by a vertical pressed metal closure plate 14. The forward and rearward vertical edges of the latter are bent inward and toward each other to provide a pair of vertically extending retaining flanges 14a, each spaced slightly inward from the inner surface of the plate 14 to provide a corresponding pair of retaining channels of hairpin section, Fig. 2. The vertically extending base of each retaining channel comprises the forward and rearward vertical edge respectively of the closure plate 14 and is welded to the corresponding adjacent inner edge of the supporting channel 13. Secured within each of the hairpin retaining channels is the bent back hook portion 15a of a suitable fastening member 15 which loops closely around the inner surface of the associated flange 14a and is embedded within the compressible body of a windlass 16 extending longitudinally of the inner edge of the pillar A in position to serve as a batten between the latter and adjacent closed door B or C. The fastener 15 is preferably of spring material so as to hold the windlass yieldingly against the associated closed door and may comprise a continuous convoluted wire formed construction extending the length of the windlass 16. Also spacing the inner edges of the supporting channel 13 at the lower portion thereof is a channel-like reinforcing member 17, the lower end of which bends inward below the pillar A for supporting attachment with the vehicle frame.

In the present instance, the portion of the fastener member 15 adjacent the inner surface of the associated flange 14a is held snugly against that flange by an interior trim panel which extends completely across the inner surface of the pillar and is firmly secured thereto as discussed below. The trim panel may in general be of conventional construction comprising a rigid fibrous backing 18, an intermediate padding layer 19, and an inner trim layer of plastic or fabric material 20 overlying the inner surface of the padding layer and having marginal portions tucked around and suitably cemented or bonded to the backside of the foundation.

In order to effect a simple positive attachment between the pillar and the interior trim panel, the plate 14 is provided with a central vertically extending channel element 21 which projects from the panel 14 outward with respect to the vehicle body into the channel of the pillar and enlarges from a reduced or constricted resiliently expansible neck portion 22 partially closing the channel mouth. Aligned to fit within the enlarged body portion of the channel 21 are a plurality of vertically spaced resilient pressed metal channel-like inserts 23, each having an enlarged channel body opening inward through a reduced channel neck portion 24 and being insertable into the channel 21 upon mutual yielding of the insert 23 and the channel neck 22. The opposed sidewalls of each channel element 23 are flared at 25 so as to lie flat against the outer surface of the backing 18, each terminating in a pair of retaining prongs 26 which extend through the backing 18 and are secured thereto by bending snugly against the inner surface thereof. In order to facilitate fabrication of the pillar trim panel, the channel-like inserts 23 are preferably formed as indicated in Fig. 3 with the prongs 26 extending substantially at right angles to the flanges 25. The prongs are inserted through the backing 18 or through apertures therein and clinched over against its inner face as indicated in Fig. 2 prior to application of the padding layer 19. Thereafter the layers 19 and 20 are superimposed on the backing 19 and the panel is completed by customary methods.

The resiliency of the material of the channel elements 21 and 23 is determined so that the element 23 may be removably forced or snapped into interlocking engagement with the element 21, or withdrawn therefrom, by passage through its channel mouth. The two channel elements are preferably dimensioned so that upon insertion of the element 23 into the element 21, these elements will remain in spring pressed engagement with each other as indicated in Fig. 2 to prevent play and rattling. In this regard, the opposed sidewall portions of the element 21 curve cylindrically toward the reduced neck 22 so as to press snugly against corresponding cylindrically curved sidewall portions of the interfitting element 23 near the reduced neck 24 and thereby to exert a continuous spring force tending to cam the element 23 into the channel of the element 21. As a result, the interior trim panel is drawn firmly toward the plate 14.

Where it is desired to increase the yieldability of the channel element 23, each of the opposed portions of the neck 24 at each end is provided with a small slot 27 extending partially the length thereof, Fig. 3. In order to hold the trim panel against vertical displacement a short horizontal channel element 28 is provided in the plate 14, as for example near the top thereof, Fig. 1, and an interfitting horizontal channel insert 23 is carried by the trim panel to support the latter upon being inserted into the channel 28.

Referring to Figs. 4 and 5, a modification of the present invention is shown employed with an interior trim panel for the vehicle door C having an interior sheet metal panel 29 provided with a number of slot-like apertures 30 near its edges. Extending longitudinally of each slot-like opening 30 is a cylindrically curved channel-like socket element or receptacle 31 of slightly greater diameter than the width of the aperture 30. Intermediate the ends of the socket element 31, its curved sidewalls converge to a reduced channel neck 32 which extends inwardly freely through the aperture 30, Fig. 4. The opposed portions of the channel neck 32 bend oppositely from each other in rounded flanges 33 which terminate snugly against the inner surface of the panel 29. As indicated in Fig. 4, the width of the neck 32 is determined so that in the untensioned condition of the latter, it will be spaced slightly from the adjacent edges of the aperture 30 on either side. Thus the channel mouth may be widened by springing the opposed portions of the neck 32 away from each other.

At each end of the intermediate neck 32, the sidewalls of the channel element 31 extend through the aperture 30 in reduced neck portions 35, Fig. 5, which snugly engage the adjacent edges of the aperture 30 to prevent play or movement of the channel element 31 and terminate in flanges 36 bent snugly against the inner surface of the panel 29. Referring to Fig. 5, the portion of the neck 32 and flange 33 on each side of the channel element 31 are spaced at each end from the corresponding adjacent neck portion 35 and flange 36 by a narrow slot 37 extending transversely of the channel element 31, which thereby permits flexing of the opposed portions of the neck 32 independently of the neck portions 35. In order to facilitate assembly of the channel elements 31 with the panel 29, the former may be first formed with the flanges 33, 36 extending as parallel continuations of the corresponding neck portions 32, 35, Fig. 5. The flanges may thus be readily inserted inward through the corresponding panel aperture 30 and thereafter bent against the inside of the panel 29 as aforesaid to the positions shown in Fig. 4 and in phantom, Fig. 5.

The construction of the interior trim panel for the door C may be similar to the pillar trim panel, comprising in the present instance a rigid fibrous backing 38, an intermediate padding layer 39, and an inner cover layer 40 of plastic or fabric material. Associated with each socket element 31 is a channel-like insert 41 insertable through the mouth of the element 31 into spring pressed interlocking engagement therewith substantially in the manner of the interengagement between the channel elements 21, 23. Also corresponding in function and similar to the neck portion 24, flanges 25, and fastening prongs 26, the channel element 41 is formed with a reduced neck 42 having oppositely directed flanges 43 which lie flat against the outer or backside of the backing 38 and terminate in prongs 44. The latter in turn extend through the backing 38 and bend snugly against the inner surface thereof to secure the backing 38 and element 41 securely together.

The outer side portions of the channel element 41 converge outwardly toward the channel base as flat longitudinally extending cam or wedge surfaces 45 to facilitate their insertion through the channel mouth of the element 31. From the flattened surfaces 45, the opposed channel sides curve cylindrically toward each other in the manner of the sides of the channel 23 and are dimensioned to fit snugly in spring pressed relationship against the cylindrically curved side portions of the channel element 31 near the neck 32.

By the structure shown in Figs. 4 and 5, the interior door trim panel may be readily secured in position merely by snapping each element 41 into interfitting engagement with the associated socket element 31. In this action, the converging channel sides 45 are forced between the neck portions 42, whereupon mutual yielding of the resilient elements 31 and 41 permit passage of the latter's enlarged channel body into the channel of the former. Thereupon, the channel elements return substantially to their untensioned positions in spring pressed engagement with each other, resiliently confining the channel element 41 within the element 31.

Fig. 6 shows a modified insert element of resilient sheet metal material comprising a body 46 adapted to lie flat against the back surface of an interior trim panel foundation such as either the foundation 18 or 38, and providing four corner prongs 47 comparable to the prongs 26 or 44 for securing the panel foundation and body 46 snugly together. Integral with one edge of the body 46 is an extension 48 which loops inward and back on itself toward the body 46 in a rounded almost closed loop to comprise a channel-like element comparable to either of the channel elements 23 or 41. The loop 48 terminates in an edge 49 spaced from both the body 46 and adjacent portion of the loop 48 by a longitudinal gap 50, which thus permits the sides of the loop 48 to spring resiliently toward each other upon being inserted through the constricted mouth of a channel-like socket element similar to either of the elements 21 or 31. The insert 46, 48 may be used with either of the modifications illustrated in Fig. 2 or Fig. 4 and readily permits a large degree of flexibility within the elastic limits of its material without recourse to a structure comparable to the slots 27.

I claim:

1. In a vehicle body construction, a vertical pillar comprising a channel member opening inward with respect to the vehicle body, a vertical closure plate secured to said channel member across the channel mouth thereof, said closure plate having a channel-like receptacle extending vertically substantially the length thereof and projecting into the channel member and opening inward with respect to the vehicle body through a constricted channel mouth from an enlarged interior, an interior trim panel overlying the inner surface of said closure plate, means detachably securing the plate and trim panel together comprising a plurality of vertically extending and vertically spaced channel-like inserts carried by the trim panel, each insert having an enlarged channel body snugly confined within the receptacle and also having a reduced neck portion extending through the aforesaid constricted channel mouth of the receptacle and secured to the trim panel, the sidewalls of the receptacle at the mouth thereof and the enlarged channel body of the insert being resiliently yieldable relative to each other and the enlarged channel body of the insert being thereby removably insertable through said reduced receptacle mouth.

2. In a vehicle body construction, a vertical pillar channel opening inward with respect to the vehicle body, a vertical closure plate secured to said pillar channel across the channel mouth thereof, said closure plate having a vertically extending channel-like receptacle projecting into the pillar channel and opening inward with respect to the vehicle body through a constricted channel mouth from an enlarged interior, an interior trim panel comprising a rigid backing layer overlying the inner surface of said closure plate and a cover layer overlying the inner surface of the backing layer and secured to the latter, and means detachably securing the plate and trim panel together comprising a plurality of vertically spaced channel-like inserts carried by the trim panel, the sidewalls of each channel-like insert comprising an enlarged channel body snugly confined within the receptacle and also comprising neck portions of reduced spacing extending through the constricted receptacle mouth, said neck portions terminating in oppositely directed flanges parallel and adjacent the outer surface of the backing layer, said flanges having prongs extending through the backing layer and folded snugly against the inner surface of the backing layer intermediate the latter and the cover layer, the sidewalls of the receptacle at the mouth thereof and the enlarged channel body of the insert being resiliently yieldable relative to each other and the enlarged channel body of the insert being thereby removably insertable through said reduced receptacle mouth.

3. In a vehicle body construction, a rigid body panel having a plurality of spaced slot-like apertures therein, a channel-like receptacle of resilient material associated with each aperture having an enlarged channel body on one side of the panel of greater width than the aperture, the opposed sides of the channel body having neck portions passing freely through the aperture in spaced relation to the edges of the latter and flaring oppositely from each other at a channel mouth opening on the other side of the panel, means to secure the panel and receptacle together comprising two pairs of opposed flanges spaced by the neck portions, each flange of each pair being integral with one of each of the opposed sides of the channel body adjacent and spaced from the corresponding neck portion and passing through the aperture closely adjacent the corresponding side thereof and folded oppositely from the opposed flange of the pair snugly against said other side of the panel, an interior trim panel for said body panel, a channel-like insert of resilient material having an enlarged channel body opening through a channel neck of reduced width to a channel mouth confronting the back side of the trim panel, the sides of the insert at the channel mouth thereof being oppositely flared adjacent the back side of the trim panel and being secured to the latter panel, the enlarged channel body of the insert being resiliently yieldable for insertion through the receptacle mouth and being dimensioned to fit snugly within the receptacle with the insert neck passing through the receptacle mouth, the receptacle neck portions being likewise resiliently yieldable for passage of the enlarged insert channel body therethrough.

4. In a vehicle body construction, a rigid body panel having a plurality of spaced slot-like apertures therein, means for releasably engaging a fastener insert and comprising a channel-like receptacle of resilient material associated with each aperture and having an enlarged channel body on one side of the panel of greater width than the aperture, the opposed sides of the channel body having neck portions passing freely through the aperture in spaced relation to the edges of the latter and flaring oppositely from each other at a channel mouth opening on the other side of the panel, means to secure the panel and receptacle together comprising two pairs of opposed flanges spaced by the neck portions, each flange of each pair being integral with one of each of the opposed sides of the channel body adjacent and spaced from the corresponding neck portion and passing through the aperture closely adjacent the corresponding side thereof and folded oppositely from the opposed flange of the pair firmly against said other side of the panel.

5. In a fastener device for a panel, a channel-like receptacle of resilient material having an enlarged channel body at one side of the panel and opening at a channel mouth through a reduced channel neck passing freely through a slot-like aperture in the panel, the opposed channel sides at the neck being thereby adapted to be yieldingly sprung apart from each other toward the edges of said aperture, the opposed channel sides at the mouth flaring outwardly from each other adjacent the other side of the panel, and two pairs of opposed flanges spaced longitudinally of the receptacle by the channel neck, each flange of each pair passing through the aperture in closely fitting engagement with one of each of the edges of the aperture and being integral with one of each of the opposed sides of the channel body and spaced endwise of the channel neck, the flanges of each pair being folded oppositely from each other tightly against said other side of the panel.

6. In a fastener device for a panel, a channel-like receptacle of resilient material having an enlarged channel body at one side of the panel and opening at a channel mouth through a reduced channel neck passing freely through a slot-like aperture in the panel, the opposed channel sides at the neck being thereby adapted to be yieldingly sprung apart from each other toward the edges of said aperture, the opposed channel sides at the mouth flaring outwardly from each other adjacent the other side of the panel, and means to secure the panel and receptacle together including opposed flange means integral with the receptacle and passing through the aperture in closely fitting engagement with the opposed edges of the latter and also folded oppositely from each other tightly against said other side of the panel.

THOMAS W. HOSKING.

References Cited in the file of this patent

UNITED STATES PATENTS

| Number | Name | Date |
|---|---|---|
| 608,495 | Walter | Aug. 2, 1898 |
| 622,220 | Goldsborough | Apr. 4, 1899 |
| 997,214 | Steiner | July 4, 1911 |
| 1,200,743 | Marendowski | Oct. 10, 1916 |
| 1,872,149 | Ledwinka | Aug. 16, 1932 |
| 2,014,419 | Voigt | Sept. 17, 1935 |
| 2,169,503 | Schlegel | Aug. 15, 1939 |
| 2,199,347 | Roethel | Apr. 30, 1940 |
| 2,231,316 | Bailey | Feb. 11, 1941 |